United States Patent [19]

Carlberg

[11] 4,157,696

[45] Jun. 12, 1979

[54] ANIMAL LITTER PELLETS

[76] Inventor: George Carlberg, Rte. 1, Box 24, Manns Choice, Pa. 15550

[21] Appl. No.: 829,347

[22] Filed: Aug. 31, 1977

[51] Int. Cl.² .............................................. A01K 29/00
[52] U.S. Cl. ........................................................ 119/1
[58] Field of Search .................... 119/1; 71/21, 23, 31, 71/25, 64 G

[56] References Cited

U.S. PATENT DOCUMENTS

| | | | |
|---|---|---|---|
| 2,649,759 | 8/1953 | Gibbs | 119/1 |
| 3,776,188 | 12/1973 | Komakine | 119/1 |
| 3,836,676 | 9/1974 | Komakine | 71/64 G |
| 3,921,581 | 11/1975 | Brewer | 119/1 |

*Primary Examiner*—Hugh R. Chamblee
*Attorney, Agent, or Firm*—Francis A. Keegan

[57] ABSTRACT

An animal waste liquid absorbent and deodorizing composition for use as an animal litter. It is a mixture of flyash and a particulate flow channeling means particularly cellulosic fibrous material produced by papermaking processes but also including other cellulosic fibers, inorganic particles and powdered agricultural wastes, such as various pulpy materials. The mixture is compressed into pellets having a major dimension greater than the dimension of each particle forming the particulate flow channeling means. The pellets are formed with discrete paths within each pellet. These paths are formed from particles of the particulate flow channeling means which on contact with animal waste liquid permit quick liquid movement between the pellet surface and the interior of the pellet to achieve penetration below the surface of the pellet and simultaneously direct the liquid into effective contact with the flyash substantially throughout the pellet. There results a more rapid deodorization and dehydration of the animal waste liquid.

The method of deodorizing and dehydrating animal waste liquid from excrement and excretion comprising: mixing up to 95 parts of flyash to each part of a particulate liquid flow channeling means for an animal waste liquid; substantially coating the particulate flow channeling means with flyash and compressing the mixture into pellets, each having a major dimension greater than the dimension of each particle forming the particular flow channeling means; forming a plurality of discrete paths within each pellet to permit and promote quick liquid movement between the surface of the pellet and the interior of the pellet; thereafter positioning the pellets to receive animal waste liquid and absorbing the animal waste liquid by capillary action through paths below the surface of the pellet and into effective contact with the flyash within the pellet to deodorize and dehydrate the animal waste liquid.

20 Claims, No Drawings

ANIMAL LITTER PELLETS

BACKGROUND OF THE INVENTION

I. Field of the Invention

This invention relates to a liquid absorbent and deodorizing composition and a method for achieving deodorization and dehydration of an odorous liquid. More particularly, the invention relates to an animal litter composition and a method for deodorizing and dehydrating the animal waste liquid produced by animal excretion and excrement. The field of use is primarily for domesticated animal pets, particularly, but not exclusively, those of the feline species.

II. Description of the Prior Art

The increase in animal pet population the world over and particularly in the United States has led to an increasing use of animal litter materials. This has demonstrated the need for an improved and effective litter product that is practical and economical.

There are numerous animal litter products suggested in the prior art, some of which are commerically available today to meet the demand for an animal litter, particularly, one for domesticated pets and more especially, household pets. In many instances where pets are kept in human living quarters, animal wastes pose a very real problem that is often solved by the use of an aminal litter. Feline species of pets adapt to the use of a litter easily, and canine and other pets apparently can be trained successfully to do likewise.

The animal litter products that have been heretofore suggested or which are available commercially have found some success; however, the cost of many of these products as well as their effectiveness in deodorizing and dehydrating the animal waste liquid derived from both animal excretion and excrement has left much to be desired. Many of the prior litter materials are part of the natural resources and are either limited in quantity or becoming less economically suitable for such use.

Ideally the most useful animal litter composition would be one that utilizes industrial or agricultural process waste materials. The effective use of industrial or agricultural process waste materials would ease the requirements upon an already overburdened waste disposal system. The desired animal litter product must also exhibit effective and rapid deodorization upon coming in contact with the animal's waste liquid in both excretion and excrement and obviously the animal litter must be harmless to the animal. There should also be no adherence of litter to the animal's fur or feet to be tracked outside of the litter area, particularly when the litter is used within a household.

Clay materials and other inorganic absorbents are well known and are presently sold commercially as animal litter, but such products, while sometimes relatively inexpensive, are not sufficiently effective or appropriate. Also these materials are not industrial or agricultural wastes and therefore their use does not alleviate the existing problems of waste disposal.

In the inventor's prior U.S. Pat. No. 3,877,920, the use of flyash to deodorize various organic wastes, such as animal manures including those of domestic pets, was disclosed. The resulting deodorized wastes were found useful as fertilizer compositions.

Animal litter compositions composed of granulated alfalfa are disclosed in U.S. Pat. Nos. 3,286,691 and 3,425,397. These compositions utilize the chorophyll in alfalfa to serve as a deodorizer when the animal waste is mixed with the litter compositions.

Another animal litter disclosure is found in U.S. Pat. No. 3,921,581 in which pellets may be composed of finely divided powders and may include cellulosic material and various clays that are combined with a perfume agent to release a fragrance upon moisture contact.

The use of flyash alone as an animal litter would achieve a superior level of deodorization, but, unless it is pelletized or otherwise agglomerated, the dust created due to the ultra-fine particle size of the flyash would be objectionable, as would be the tracking of the flyash by the animal from the litter area. Pelletizing or otherwise compressing the flyash, which has a minute particle size, produces such a dense product that the animal waste liquid does not gain access to the interior of such a compressed product or pellet but must await a substantial period of time for seepage, thus defeating the advantages of the superior deodorizing capability of the flyash. For these and other reasons flyash has not heretofore been recognized as being useful as an efficient, effective animal litter material.

III. Objects of the Invention

The primary object of the present invention is to create an effective, efficient and useful animal litter product.

It is also an object of the present invention to create a new useful and valuable product by utilizing industrial or agricultural waste products that would otherwise impose a burden on industry for their disposal.

A further object of the invention is to use as the industrial wastes, flyash and also preferably cellulose fibers from a paper-making process to create a useful product without the use of natural resources.

This invention also has as an object the utilization of flyash in pellet form to deodorize animal waste liquid and to form discrete paths for capillary action to draw this odorous liquid into the pellet below the surface to increase contact with the flyash for quicker deodorization and dehydration.

SUMMARY OF THE INVENTION

The animal litter composition and the method for deodorizing and dehydrating animal waste liquid present in animal excretion and excrement achieve a unique result by fully utilizing the superior deodorizing capabilities of flyash while avoiding objectionable dusting and tracking problems. The animal litter comprising the present invention is a pelletized flyash composition which provides a means for rapid access of the animal waste liquid to the interior of the animal litter pellet. The pellet achieves rapid deodorization and dehydration of the animal waste liquid, but at the same time retains its physical integrity, thereby avoiding dusting problems.

The rapid access of the animal waste liquid to the interior of the pellet containing flyash is achieved preferably through the use of the fibrous material derived as a product of the paper-making process. These cellulosic fibers have been found to be particularly useful to produce channels or discrete paths from the surface of the pellet to the interior of the pellet to permit capillary action to draw the animal waste liquid down into intimate and active contact with the flyash in the interior of the pellet. Deodorization and dehydration therefore take place in the most efficient manner.

To a substantially lesser degree, the capillary action may be achieved by the paths or channels being formed from other contiguous particles of inorganic materials, such as various clays including bentonite, attapulgite, kaolin, and the like, and also vermiculite and perlite. Various other cellulosic fibrous materials, particularly those that may have been processed to remove all or part of the natural oil or resins in the cellulosic fiber, are useful and may include sawdust, hay, various vegetable husks, and the like. Also of use are powdered agricultural wastes that may be derived from such pulpy materials as citrus pulp, beet pulp, corn cobs, rice hulls, and the like.

DESCRIPTION OF THE PREFERRED EMBODIMENT

The animal litter forming the present invention is a unique combination of flyash and a liquid flow channeling means formed into a pellet. It is useful as a litter for animals, particularly household animals such as those of the feline species. It is intended that the litter be useful for any animal, such as canines, rodentia, monkeys and any other animal which may be kept in living quarters, a cage, pen or other controlled housing.

It is recognized that the feline species and in particular domestic cats adapt most easily to the use of a litter product. The cat's natural inclination to cover its waste both in the form of solid excrement or feces and liquid excrement or urine promotes the adaptation of cats to the use of the litter product. Dogs and other animals of the canine species, however, may also be trained to use the litter product successfully.

The flyash portion of the present invention is a well-known industrial waste obtained through the combustion of pulverized coal and is usually collected by electrostatic precipitation. The enormity of the disposal problem may be better understood, when it is recognized that a typical, large power-generating station may produce more than 1,000 tons of flyash a day and that the total estimated national production of flyash for 1977 is 50 million tons. This buildup of flyash and its attendant disposal problems will increase substantially in the future due to the world's greater dependence upon coal for energy in an effort to save the dwindling oil reserves.

The precipitated flyash is characterized typically by its extremely small particle size ranging from about 1 to 50 microns. The composition of flyash varies widely and is not in any way critical to its use in the present invention. The flyash composition is dependent not only upon the type of coal burned but also upon the combustion process and the nature and effectiveness of the precipitation unit. Typically, the collected flyash material is made up of silica, alumina, iron oxide, calcium oxide, sulphur oxide and various other trace materials. A representative, but by no means an all-inclusive analysis, would be the following in weight precent:

$SiO_2$ 28-58%; $Al_2O_3$ 5-38%;
$Fe_2O_3$ 8-44%; $CaO$ up to 15%;
$MgO$ up to 5%; $SO_3$ up to 8%;
$Na_2O$ up to 3% and others up to 4%.

Flyash is an effective deodorizer for odorous wastes but, because of its ultra-fine particle size, forms when compressed, a product so compact and dense that animal waste liquid has great difficulty penetrating to the interior of the pellet. Thus, with only a limited absorption capability, a pellet composed only of flyash is found to be quite ineffective.

In accordance with the present invention, the incorporation of commercial waste fibrous material, preferably in the form of cellulose fibers derived from the paper-making process, has been found to provide unique properties to a pellet composed of flyash. Such a combination enables the pellet rapidly to absorb animal waste liquid to deodorize and dehydrate such liquid, whether derived from urine excretion or solid excrement.

The cellulose fibers forming the fibrous material may be derived either as a waste by-product of the paper-making process or as waste newspapers. As obtained from the paper-making process, cellulose fibers are in the form of short fibers that pass through a screen with waste liquor during formation of the paper. Ordinarily these fibers would be filtered from the waste liquor and must be disposed of in a land fill or other disposal system. Cellulose fibers derived from waste newspapers are formed by shredding newspaper sheets through a hammermill. Newspapers exhibit a bulk density of 1.5 to 2.0 lbs. per cubic foot as compared to unshredded newspaper, which is usually in the range of 40 lbs. per cubic foot. Newspapers can also be repulped in a repulper apparatus. In either shredding or repulping, newspaper sheets are reduced to fibrous mass.

The characteristics of fibers derived from the paper-making process are such that much of the oleaginous substances and resins on or within the fibers have been removed to render them more hydrophillic than they would be in their natural state or in an untreated state. Other physical or chemical treatments that remove or extract such substances from the natural fiber may also be particularly useful.

The induced hydrophillic nature of the treated fiber provides a significant benefit to a flyash pellet by reason of its substantially increased liquid absorbency and its ability to provide a discrete path or channel for the animal waste liquid to pass below the surface of the pellet and into the interior of the pellet for greater contact with the larger mass of flyash. It has been theorized that the very rapid absorption of the animal waste liquid by the pellet containing cellulose fibers is due to capillary action creating a wick effect that draws the animal liquid into the interior of the pellet to enable the flyash to simultaneously deodorize and dehydrate the animal waste liquid.

The dehydration and deodorization described above relates not only to the animal waste liquid in the excretion but also to that in the excrement. The result of such dehydration and deodorization of animal waste liquid from either animal excretion or excrement is effectively and efficiently to deodorize both the liquid animal excretion and the solid animal excrement.

The cellulose fibers forming the fibrous mass, of the pellet whether originating from newspapers that have been shredded or repulped or whether originating from waste liquor containing short fibers that have passed through a paper-making screen, should comprise at least 5% of the total weight of the cellulose fibers and the flyash mixture. Preferably the portion would be from 1 to 2 parts flyash to 1 part cellulose fibers and more particularly 1.2 to 1.8 parts flyash per part cellulose fibers.

Preferably, the cellulose fibers have other characteristics that enable them to form the discrete paths and effect the capillary action. Preferably, the length of the fibers in the pelletized product is between 0.3 and 10 mm and the diameter of the fibers is between 0.01 and 0.5 mm. Preferably, 90% by weight of the fibers found in the final pellet would be less than 0.1 mm in diameter.

Cellulose fibers originating from the paper-making slurry of short-fiber waste liquor would be, through screening, well within the range of the preferred lengths and diameters. For shredded newspapers, the shredding or hammermilling should reduce the bulk density of the newspaper to about 1.5 to 2.0 lbs. per cubic foot, again within the preferred range.

The cellulose fibers and the flyash are intimately mixed to substantially coat all of the fibers with the fine particles of flyash. The mixing may be in a dry state or, if the cellulose fibers originate from the short fiber waste liquor of the paper-making process or from re-pulped newspapers, the mixing would be in the wet state. Moisture content is useful in the pelletizing procedure, following the intimate mixing of the flyash and the cellulose fibers.

The pelletizing of the mixture of flyash and cellulose fibers may be performed in a conventional manner. In order to pelletize the mixture, the moisture content of the mixture is brought within the preferable limits of 20% to 32% moisture, more preferably around 27% moisture. The moisture content, however, is not critical to the present invention and is merely for purposes of facilitating the pelletizing operation.

The pellets produced may thereafter be dried to less than 15% moisture, preferably about 10 to 12% moisture for use as an animal litter. The size of the pellet produced is not critical and may be generally between about 2–12 mm with a preferred length of 5 to 7 mm and a diameter of about 2 to 10 mm, preferably about 2 to 4 mm in diameter. Prior to final packaging, screening of the pellets is employed to maintain the preselected pellet size.

The pellets so produced are substantially larger than each particle of the cellulosic fiber and, accordingly, the only access for the animal waste liquid to the interior of the pellet is through the flow channeling paths formed by the particulate cellulosic fibers. These fibers extend up to and often slightly beyond the surface of the pellet and when in contact with the animal waste liquid draw the liquid by capillary action into the interior of the pellet for deodorization, while at the same time dehydrating the animal waste liquid as rapidly as possible. Only through the capillary action achieved by the cellulose fibers is the rapid liquid penetration with the desired deodorization and dehydration believed to be achieved.

Dusting which was a problem in the prior art, is found to be limited to about approximately 3% of the total weight of the pellets of the present invention. This low production of dust is within the range of acceptability; however, it may be decreased further if desired. Various pelletizing aids may be used, such as, sodium silicate, starches, sulfate liquors and clays including bentonite and attapulgite. Another useful pelletizing aid is water absorbent synthetic starch polymer composed of a polymerized combination of the natural polymer, starch, and the synthetic polymer formed from sodium acrylate and acrylamide as disclosed in U.S. Pat. No. 3,935,099. The amount of the pelletizing aid may be in the range of 1 to 10%, preferably 2 to 5% of the total weight of the pellet.

An alternative embodiment of the present invention includes various other materials that may be substituted for or mixed with the cellulosic fibers derived from the paper-making process. Each of these alternative materials alone does not produce the same rapid and effective deodorization and dehydration that is achieved by cellulose fibers derived from the paper-making process. However, it is found that some capillary action does occur with these other materials, and there is some similarity in action to that of the present invention.

Materials that are capable of channeling the flow from the surface of the pellet down into the interior for contact with the flyash include various particulate inorganic materials including clays, such as bentonite, attapulgite, kaolin, and the like, as well as vermiculite and perlite. Both bentonite and attapulgite are clays that are water swellable, hydrophillic materials. Vermiculite and perlite are similar in that they have an affinity for fluid and a porosity to receive and pass on a portion of the fluid. Such inorganic materials preferably have a particle size of less than 0.3 mm and preferably, though not necessarily, a particle size greater than that of the flyash. Other porous or water swellable materials could be similarly used as a substitute for or mixed with the fibrous material.

It has also been found that various powdered agricultural wastes in the form of pulpy materials are waste products creating disposal problems for various food processing plants. These materials may include citrus pulp waste, beet pulp, corn cobs, rice hulls and the like. These wastes may be substituted for or mixed with the fibrous material and utilized in the litter material. The particle size for the powdered agricultural waste is preferably not greater than about 0.3 mm but of a size greater than that of the flyash particle.

Other cellulose fibers may be substituted for or mixed with the cellulose fiber materials derived from the paper-making process; however, alone or as the predominant fraction they do not achieve the same measure of success and are not the preferred materials. Among these are sawdust, hay, various vegetable husks and the like.

It is theorized that these particulate powdered materials, when intimately mixed with the flyash and then pelletized, form with other particles larger than the flyash particles discrete paths extending from the surface of the pellet into the interior of the pellet. These paths are formed by contiguous larger particles that channel the animal waste liquid into greater contact with the more loosely packed contiguous flyash particles.

The compaction occurring during the pelletizing process produces the contiguous relationship between the larger particles and also produces voids adjacent to the surfaces of these larger particles. These voids are created in part by the physically larger particle size and also by the irregularity of their surfaces. The voids are at least partially filled with the much smaller flyash particles that in these voids usually cannot be compacted to the same high density that would be possible in the absence of the larger particles. It has been found that capillary action occurs along the surfaces of the larger particles and through the voids to achieve the dual function of (a) drawing the animal waste liquid along the surface of the contiguous particle and into the interior of the pellet for dehydration, and (b) permitting the animal waste liquid to contact more flyash particles within these voids, which action deodorizes the waste liquid more efficiently.

The color of the pellets produced is predominately gray in color but any conventional suitable dye may be used to achieve any selected color.

SPECIFIC EXAMPLES

I. Old newspapers were hammermilled to a light fibrous mass by being passed through a ⅜ inch screen slot. The density of the newspaper was about 1.5 lbs. per cubic foot. This fibrous mass was thoroughly mixed with flyash in a weight ratio of 1.5 parts flyash to 1.0 part paper fibers to coat the fibers with flyash particles. Water was added to adjust the moisture content to 27% moisture. Bulk density of the mix was approximately 8 lbs per cubic foot. The flyash-fiber mix was pelletized in a conventional Sprout-Waldron 501D pellet machine. The pellets had a bulk density of approximately 32 lbs per cubic foot. The compression ratio during pelletizing was approximately 4 to 1. The pellets were collected and dried to about 10-12% moisture.

These pellets were used as a domestic cat litter and found not to dust or track objectionably, but, more importantly, animal waste liquid from excrement and excretion was rapidly absorbed and deodorized.

II. In a similar manner, pellets were produced using a washed short fiber waste from a paper-making plant. Water from the short fiber liquor was extracted using centrifuges and filters, until the moisture content of the filter cake reached 50%. The same proportions and steps as in Example I were used with similar results. The uniformity of the fiber characteristics was not the same as that derived from newspapers which lack of uniformity lessened very slightly the liquid absorbing capabilities of the pellets produced.

From the foregoing, it should be manifest that the objective of creating a useful animal litter product from industrial or agricultural process wastes has been achieved. The lost cost of the ingredients is an important factor. In fact, the saving of the disposal cost of these waste solids is a positive and favorable factor in determining the marketability of the animal litter product.

I claim:

1. A liquid absorbent and deodorizing composition for use as an animal litter comprising a mixture of:
   a. flyash and,
   b. a particulate liquid flow channeling means in an amount by weight of at least 5% of the total weight of the mixture, said particulate means being selected from the group consisting of fibrous material, clays, vermiculite, perlite and powdered agricultural waste,
   said mixture being compressed into pellets having a major dimension greater than the dimension of each particle forming the particulate flow channeling means, and
   a plurality of discrete paths being formed within each pellet from said particulate flow channeling means to permit on contact with an animal waste liquid a liquid communication between the pellet surface and the interior of the pellet to achieve quick liquid penetration below the surface of the pellet and to simultaneously direct said liquid into effective contact with the flyash substantially throughout the pellet for more rapid deodorization and dehydration of the animal waste liquid.

2. The composition of claim 1 including
said particulate flow channeling means being powdered and a substantial portion of each said powder particle being contiguous to other such particles to form said discrete paths for capillary action to draw the animal waste liquid into the interior of the pellet for contact with the flyash.

3. The composition of claim 1 including
said powder particle having a dimension less than 0.3 mm.

4. The composition of claim 1 including
said particulate flow channeling means being substantially coated with said flyash to be within the discrete paths for the animal waste liquid being drawn into the interior of the pellet by capillary action.

5. The composition of claim 1 including
the major dimension of the pellet being up to 12 mm.

6. The composition of claim 1 including
the major dimension of the pellet being between 2 to 12 mm.

7. The composition of claim 1 including
said particulate flow channeling means being a fibrous material having cellulosic fibers.

8. The composition of claim 7 including
said cellulosic fibers material being produced by a paper-making process.

9. The composition of claim 7 including
about 90% by weight of said fibers being less than 0.1 mm diameter.

10. The composition of claim 7 including
said fibers having a length between about 0.3 mm to 10 mm.

11. The composition of claim 8 including
about 90% by weight of said fibers being less than 0.1 mm in diameter and having a length between about 0.3 mm to 10 mm.

12. The composition of claim 8 including
a portion of said cellulosic fibers extending from the surface of said pellet to the interior of said pellet to draw animal waste liquid by capillary action into the interior of the pellet for contact with the flyash.

13. The composition of claim 1 including
said particulate flow channeling means being a fibrous material having fibers of cellulosic origin produced by a paper-making process and about 90% by weight of said fibers being less than 0.1 mm in diameter,
said fibers having a length between about 0.3 mm to 10 mm, and
a portion of said cellulosic fibers extending from the surface of said pellet to the interior of said pellet to draw animal waste liquid by capillary action into the interior of the pellet for contact with the flyash.

14. The composition of claim 13 including
said fibrous material being substantially coated with said flyash to be within the discrete paths for the animal waste liquid being drawn into the interior of the pellet by capillary action.

15. The method of deodorizing and dehydrating animal waste liquid from excrement and excretion comprising:
   mixing up to 95 parts of flyash to each part of a particulate liquid flow channeling means for said animal waste liquid, said particulate means being selected from the group consisting of fibrous material, clays, vermiculite, perlite and powdered agricultural waste,
   substantially coating said particulate flow channeling means with said flyash,
   compressing said mixture into pellets each having a major dimension greater than the dimension of each particle forming the particulate flow channeling means, forming a plurality of discrete paths within each pellet to permit and promote liquid communication between the surface of the pellet and the interior of the pellet, providing said pellets to receive animal waste liquid, absorbing said animal waste liquid by capillary action through said paths below the surface of the pellet and into effective contact with the flyash within the pellet effectively and efficiently to deodorize and dehydrate the animal waste liquid.

16. The method of claim 15 including
said particulate flow controlling means being a fibrous material having fibers of cellulosic origin.

17. The method of claim 16 including
said cellulosic fibrous material being produced by a paper-making process.

18. The method of claim 16 including
about 90% by weight of said fibers being less than 0.1 mm in diameter.

19. The method of claim 16 including
said fibers having a length between about 0.3 mm to 10 mm.

20. The method of claim 17 including
about 90% by weight of said fibers being less than 0.1 mm in diameter and having a length between about 0.3 mm to 10 mm.

* * * * *